United States Patent
Gunby (10) Patent No.: US 9,090,199 B2
(45) Date of Patent: Jul. 28, 2015

(54) TRANSPORT TRAILER LIFTGATE APPARATUS AND METHOD OF OPERATING THE SAME

(75) Inventor: William Gunby, Newnan, GA (US)

(73) Assignee: TRANSPORT TECHNOLOGIES GROUP, INC., Newnan, GA (US)

( * ) Notice: Subject to any disclaimer, the term of this patent is extended or adjusted under 35 U.S.C. 154(b) by 850 days.

(21) Appl. No.: 12/717,547

(22) Filed: Mar. 4, 2010

(65) Prior Publication Data
US 2010/0225137 A1 Sep. 9, 2010

Related U.S. Application Data (60) Provisional application No. 61/157,398, filed on Mar. 4, 2009.

(51) Int. Cl.
*B60P 1/00* (2006.01)
*B60P 1/44* (2006.01)
*B60P 1/43* (2006.01)

(52) U.S. Cl.
CPC .............. *B60P 1/4421* (2013.01); *B60P 1/433* (2013.01); *B60P 1/435* (2013.01)

(58) Field of Classification Search
CPC .......... B60P 1/36; B60P 1/435; B60P 1/4421; B60P 1/4414
USPC ............. 296/57.1, 146.1, 106, 50, 51, 55, 56; 414/558, 462, 463, 465, 466, 469, 472, 414/482, 500, 545, 546, 556, 557, 684.3, 414/499; 16/DIG. 1
See application file for complete search history.

(56) References Cited

U.S. PATENT DOCUMENTS

| | | | |
|---|---|---|---|
| 298,942 A | | 5/1884 | Campany |
| 1,101,835 A | * | 6/1914 | Clement ....................... 296/57.1 |
| 2,110,239 A | * | 3/1938 | Richter ........................... 414/545 |
| 2,200,436 A | | 5/1940 | Van Blarcom |
| 2,421,128 A | * | 5/1947 | Pride ............................... 414/500 |
| 2,459,045 A | * | 1/1949 | Pride ............................... 414/500 |
| 2,502,079 A | * | 3/1950 | Duis et al. ....................... 296/51 |
| 3,024,926 A | * | 3/1962 | Nolden ........................... 414/545 |
| 3,180,503 A | | 4/1965 | Shaw |

(Continued)

*Primary Examiner* — Saul Rodriguez
*Assistant Examiner* — Glenn Myers
(74) *Attorney, Agent, or Firm* — Staas & Halsey LLP (57) ABSTRACT

A liftgate apparatus may include a plurality of vertical tracks attached to a rear of a trailer, each of the plurality of vertical tracks including a vertical roller chain. Tops of the plurality of vertical tracks intersect horizontal hollow structural tubes which include hydraulic cylinders. The apparatus may also include at least one bar attached to a bottom of each vertical roller chain and attached to sets of rolling wheels configured to move the at least one bar vertically inside the plurality of vertical tracks and a plurality of hinges attached to a lower end of the at least one bar and attached to a base of a liftgate, wherein the vertical roller chain lifts the at least one bar and the liftgate at hinged points. The apparatus may also include a plurality of types of link chains, wherein a first type of the link chains supports the liftgate in a closed position and the first type is affixed to the top of the at least one bar and to the liftgate, and wherein a second type of the link chains is affixed to the top of the vertical roller chain and to mid sections of the liftgate. The apparatus may further include a plurality of sprockets connected via a shaft, wherein the vertical roller chain travels over at least one of plurality of sprockets and connects the hydraulic cylinders to the least one bar, thereby moving the at least one bar and the attached liftgate in a synchronized manner.

17 Claims, 8 Drawing Sheets

(56) References Cited

U.S. PATENT DOCUMENTS

| | | | |
|---|---|---|---|
| 3,275,170 A * | 9/1966 | MaCrae et al. | 414/545 |
| 3,371,805 A | 3/1968 | Himes | |
| 3,747,782 A * | 7/1973 | Brown | 414/545 |
| 3,795,329 A * | 3/1974 | Martin et al. | 414/545 |
| 3,831,788 A | 8/1974 | Erlinder | |
| 3,870,126 A * | 3/1975 | Himes | 187/403 |
| 3,877,590 A | 4/1975 | Brown | |
| 3,887,092 A * | 6/1975 | Leet | 414/545 |
| 4,007,844 A | 2/1977 | Perkins | |
| 4,063,619 A | 12/1977 | Drews | |
| 4,087,007 A | 5/1978 | Drews | |
| 4,198,188 A | 4/1980 | Perkins | |
| 4,540,329 A * | 9/1985 | Martin | 414/545 |
| 4,563,121 A | 1/1986 | Drews | |
| 4,806,062 A | 2/1989 | Stier | |
| 4,813,842 A * | 3/1989 | Morton | 414/557 |
| 4,930,969 A * | 6/1990 | Langer | 414/540 |
| 4,930,971 A | 6/1990 | Wilson | |
| 4,984,955 A * | 1/1991 | McCullough | 414/546 |
| 4,993,908 A | 2/1991 | Park | |
| 5,176,486 A | 1/1993 | Park | |
| 5,263,808 A * | 11/1993 | Kent | 414/545 |
| 5,449,267 A | 9/1995 | Ablabutyan | |
| 5,511,922 A * | 4/1996 | Sekiguchi et al. | 414/139.6 |
| 5,513,943 A * | 5/1996 | Lugash et al. | 414/545 |
| 5,597,282 A * | 1/1997 | Hoffman et al. | 414/545 |
| 5,683,221 A * | 11/1997 | Ablabutyan | 414/540 |
| 5,951,233 A * | 9/1999 | Boucher et al. | 414/495 |
| 6,135,532 A * | 10/2000 | Martin | 296/61 |
| 6,607,232 B2 * | 8/2003 | Katulka | 296/57.1 |
| 6,746,200 B1 * | 6/2004 | Rinke | 414/545 |
| 7,347,476 B2 * | 3/2008 | Luehr et al. | 296/61 |
| 7,478,984 B2 * | 1/2009 | Hofius | 410/27 |
| 7,491,026 B2 * | 2/2009 | Hooker | 414/545 |
| 2008/0036172 A1 * | 2/2008 | Hofius | 280/405.1 |
| 2008/0298942 A1 * | 12/2008 | Gregg et al. | 414/545 |

* cited by examiner

TRANSPORT TRAILER LIFTGATE APPARATUS AND METHOD OF OPERATING THE SAME

BACKGROUND OF THE INVENTION

1. Field of the Invention

The present invention is directed to a liftgate apparatus.

2. Description of the Related Art

Liftgates may be attached to vehicle trailers or other forms of vehicle cargo holds to assist with loading and unloading. In general, liftgate apparatuses include a platform or deck and a motorized system that is used to move the platform. There are several types of liftgate apparatuses, including a rotating platform apparatus and column type lift apparatuses which include rod screw type lift apparatuses and sliding bar column lift apparatuses.

The rotating platform apparatus may include a relatively small platform which, in the stored position, may serve as the rear enclosure for the vehicle, may fold up behind the rear enclosure, or may fold up underneath the back of the vehicle. Its vertical height limitation is usually the height of the bed of the trailer and is approximately four feet above ground level. Typically, this type of liftgate apparatus may include hydraulic cylinders hooked to control arms or levers. Thus, this type of liftgate apparatus is very limited in its vertical capabilities. Furthermore, the relatively small "footprint" or size of the platform means that large items, for example, automobiles, cannot be placed on the platform to be raised.

Column type liftgate apparatuses typically use hollow columns, placed vertically, one on each side of the back of the vehicle. Unlike the rotating platform apparatus, the column type liftgate apparatuses may be raised to as much as ten feet above ground level. The rod screw type liftgate apparatuses may include a machined rod screw placed vertically inside the column and which can be turned clockwise or counterclockwise. Grooves may be machined in the rod screw along its length, giving it the appearance of a barber pole. Ball joints with similar grooves may be fitted inside the rod screw grooves so that as the rod turns clockwise or counter-clockwise, the ball joints may move up and down. The platform may be attached to this ball joint and thus moves vertically as the ball joint moves up and down. A major drawback of this type of liftgate apparatus is price. This type of liftgate apparatus also requires skilled personnel for operation.

Sliding bar column liftgate apparatuses replace the rod screw with a sliding bar approximately five feet long in each column. These sliding bars may move vertically inside the hollow column by means of friction slides or rollers. They are typically attached to hydraulic cylinders one of each side, mounted vertically inside the columns. As the hydraulic cylinders extend, because they are attached to the sliding bars, they raise or lower the sliding bars which are also attached via a hinge to the liftgate. With telescoping cylinders, this type of liftgate can reach heights of approximately eight feet above ground level. Two or more people are typically required to open and close this device. Because the slide bars of this type of liftgate extend beyond the roof of the attached vehicle, one side tends to get ahead of the other causing jamming. Furthermore, with the cylinders in the rear, this type of liftgate can add 12 inches or more to the length of the attached vehicle. There are also problems typically associated with maintenance and access of these types of apparatuses.

With traditional liftgates of both screw and slide bar types, the liftgate must be rotated into position underneath an overhanging roof, then raised vertically against a rubber or similar type seal so that the roof and seal can prevent air or rain leakage to the inside of the vehicle. Because some of these prior art devices utilize friction guides beside the slide bars, friction is created by these guides or spacers. As a result, in these prior art devices the liftgate may stop moving just before it is fully closed and the liftgate cannot be opened or closed without application of physical force. Therefore, when being closed, these prior art devices require physical force by one or more men to push the gate closed as another individual works the hydraulic controls to raise the gate under the overhanging roof. To open the gate, men must go inside the truck/trailer and push the gate outward from the inside after it is lowered out from under the overhanging roof. Thus, in these prior art devices a single individual cannot operate these liftgates.

SUMMARY OF THE INVENTION

Embodiments herein may be directed to a liftgate apparatus, comprising a plurality of vertical tracks attached to a rear of a trailer, each of the plurality of vertical tracks including a vertical roller chain. Tops of the plurality of vertical tracks intersect horizontal hollow structural tubes which include hydraulic cylinders. The apparatus may also include at least one bar attached to a bottom of each vertical roller chain and attached to sets of rolling wheels configured to move the at least one bar vertically inside the plurality of vertical tracks and a plurality of hinges attached to a lower end of the at least one bar and attached to a base of a liftgate, wherein the vertical roller chain lifts the at least one bar and the liftgate at hinged points. The apparatus may also include a plurality of types of link chains, wherein a first type of the link chains supports the liftgate in a closed position and the first type is affixed to the top of the at least one bar and to the liftgate, and wherein a second type of the link chains is affixed to the top of the vertical roller chain and to mid sections of the liftgate. The apparatus may further include a plurality of sprockets connected via a shaft, wherein the vertical roller chain travels over at least one of plurality of sprockets and connects the hydraulic cylinders to the least one bar, thereby moving the at least one bar and the attached liftgate in a synchronized manner.

Embodiments herein may also be directed to a method of opening and operating a liftgate of an apparatus. The method may include releasing a set of mechanical latches via a plurality of sprockets connected via a shaft, wherein vertical roller chains travel over at least one of plurality of sprockets and connect hydraulic cylinders to least one bar configured to move the liftgate into a horizontal position; engaging the hydraulic cylinders and pushing the liftgate outward at the top by levers which are activated as the latches are released; as the liftgate moves into a horizontal position, slackening a first set of link chains which supports the liftgate in a closed position and which is affixed to the top of the at least one bar and to the liftgate; tightening a second set of link chains affixed to the top of the vertical roller chains and to mid sections of the liftgate as the liftgate reaches the horizontal position; and moving the liftgate using the hydraulic cylinders.

Embodiments herein may also be directed to a method of closing a liftgate of an apparatus. The method may include vertically moving the liftgate and attaching a first set of link chains which supports the liftgate in a closed position and which is affixed to the top of at least one bar and to the liftgate, wherein the bar is connected to the liftgate via hinged points; releasing hydraulic pressure via vertical roller chains which are attached to the at least one bar to cause the liftgate to move from horizontal to a vertical position; and upon the liftgate reaching a vertical position, tripping latches and a rain cap into position to prevent the liftgate from opening.

DETAILED DESCRIPTION OF EMBODIMENTS

Embodiments herein may incorporate embodiments of liftgate apparatuses that may rotate from a vertical plane to a horizontal plane and then move as a horizontal platform vertically from the ground level up to first and second deck levels of an attached trailer. Embodiments of the liftgate apparatus can also be configured to serve as a ramp to load vehicles into the lower deck level of the attached trailer.

Figure 1:
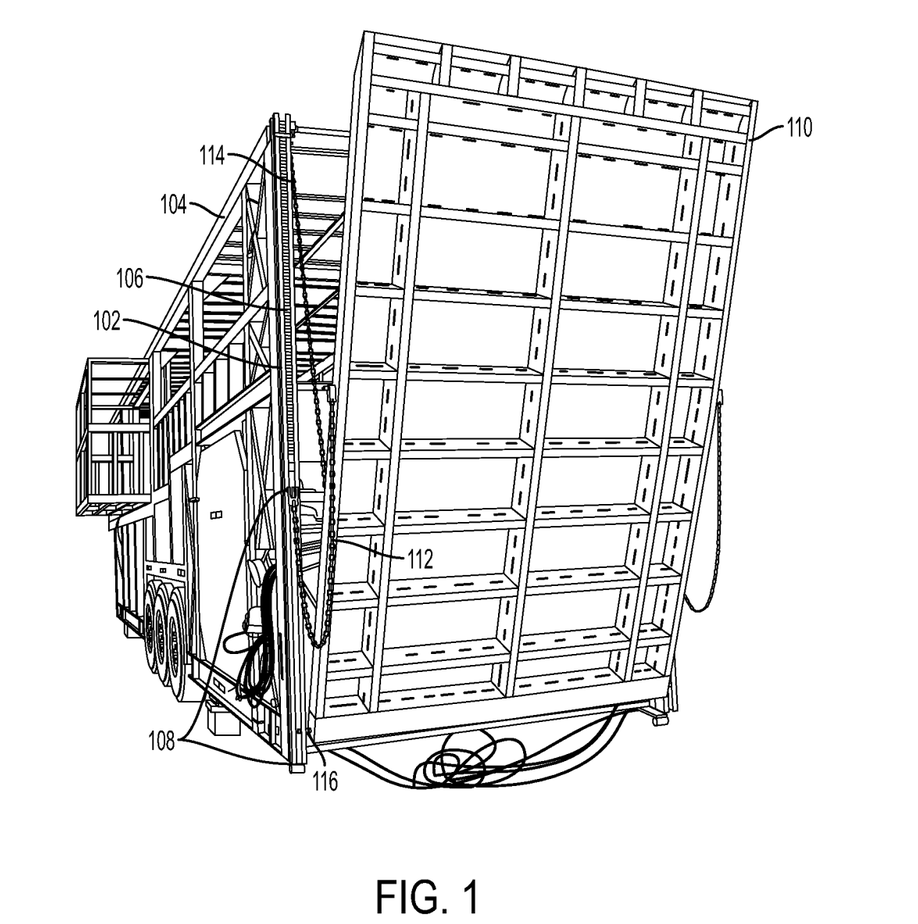
FIG. 1 illustrates an embodiment of the inventive liftgate apparatus.

FIG. 1 illustrates an embodiment of the liftgate apparatus. FIG. 1 shows features of the liftgate apparatus as seen from the right side of the rear of the trailer. For ease of reference, components are discussed in the singular with respect to one side, but as would be evident to one skilled in the art, that each of the components shown on the right side of the trailer may also be provided on the left side of the trailer. According to an embodiment of the invention, two vertical tracks 102 may be attached to the rear of a trailer, one track on each end of the trailer. Inside each track 102 may be an industrial roller chain 106 which may extend vertically. The bottom of each roller chain 106 may be attached to the upper end of a steel bar 108. Also attached to bar 108 may be multiple sets of rolling wheels, called trolleys. The trolleys may allow each bar 108 to move vertically inside tracks 102 without friction.

Figure 3:
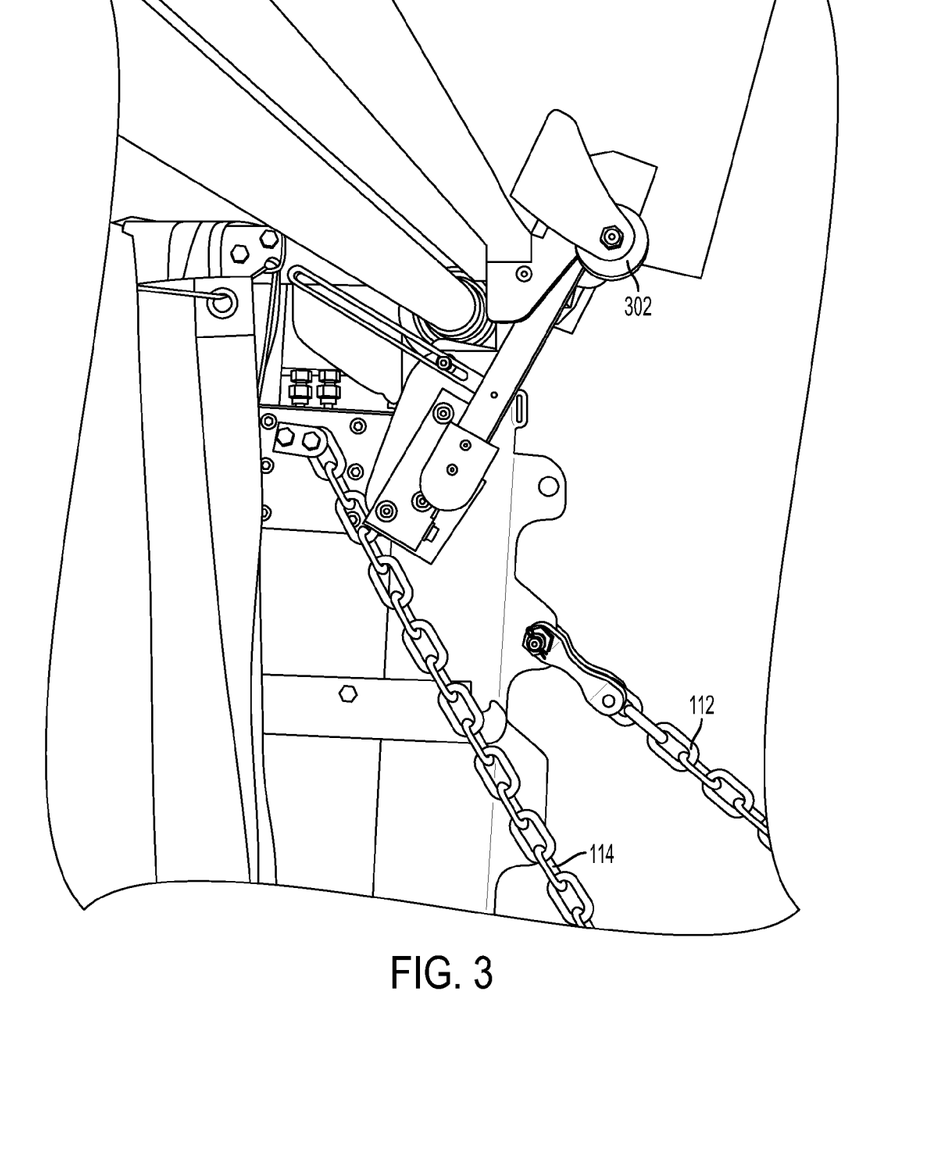
FIG. 3 illustrates an embodiment of a rain guard/latch assembly used in embodiments of the invention.
Figure 6:
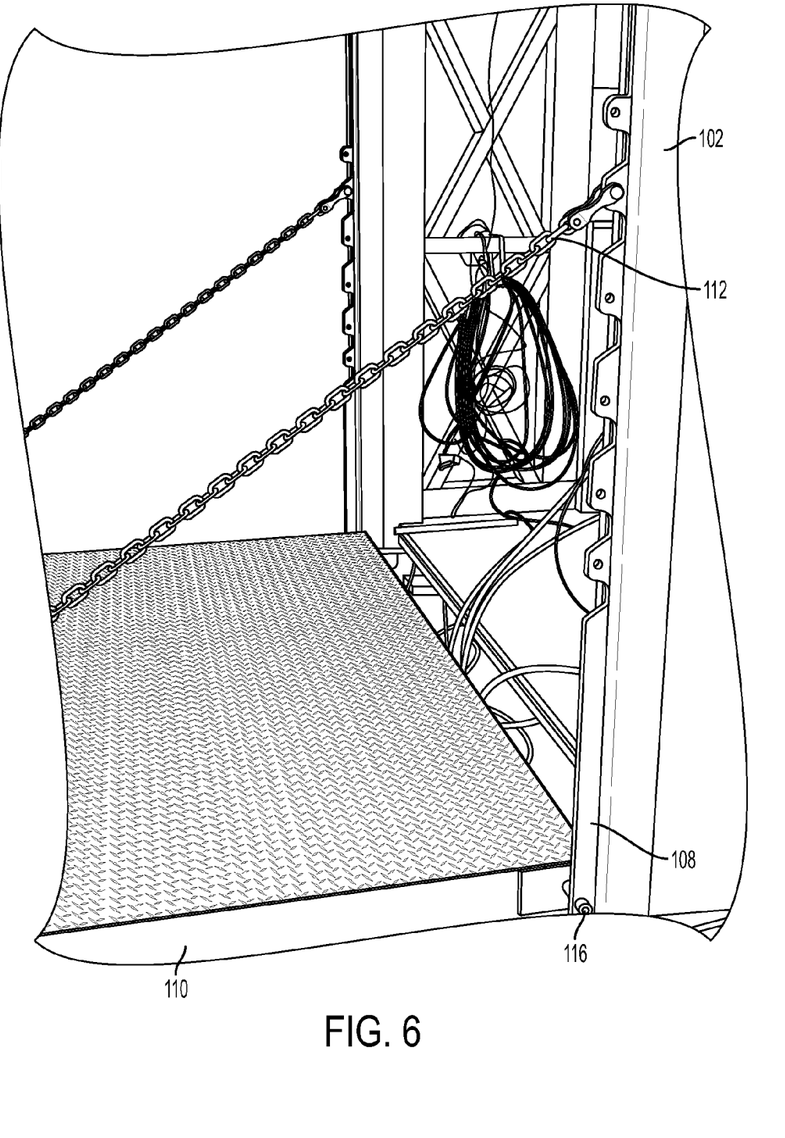
FIG. 6 further illustrates an embodiment of the liftgate apparatus, wherein the liftgate is in the full horizontal or platform position.

On the lower end of each bar 108 may be hinge 116 which may be attached to the base of a liftgate/platform 110; hinge 116 may be a full width hinge that extends across the width between tracks 102. The movable bar 108 may be approximately one inch wide by five feet long. A diagonal link first chains 112 may be affixed to the bar 108; as seen in FIGS. 3 and 6, bar 108 may have several different points to which first chain 112 can attach. The other end of chains 112 may be attached to liftgate 110 some distance out from hinge 116 that connects the liftgate 110 and bar 108. When deployed, creates a triangle between the top of bar 108 and liftgate 110 which has its hinge 116 attached to the bottom of the bar 108.

The top of vertical tracks 102 may intersect horizontal hollow structural tubes or headers 104 which may run forward along the top of the trailer. Inside these tubes may be hydraulic cylinders. The roller chain 106, which may be connected to and lifts the bar 108, may travel vertically up the inside of track 102 to the top and then travel over a sprocket 132 (shown in FIG. 2). The sprocket 132 may turn the roller chain 106, for example, 90 degrees so that industrial chain 106 can travel horizontally along the cylinder where it may encircle another sprocket connected to the piston end of the cylinder (not shown). The end of roller chain 106 may then connect to the body of the cylinder.

Figure 2:
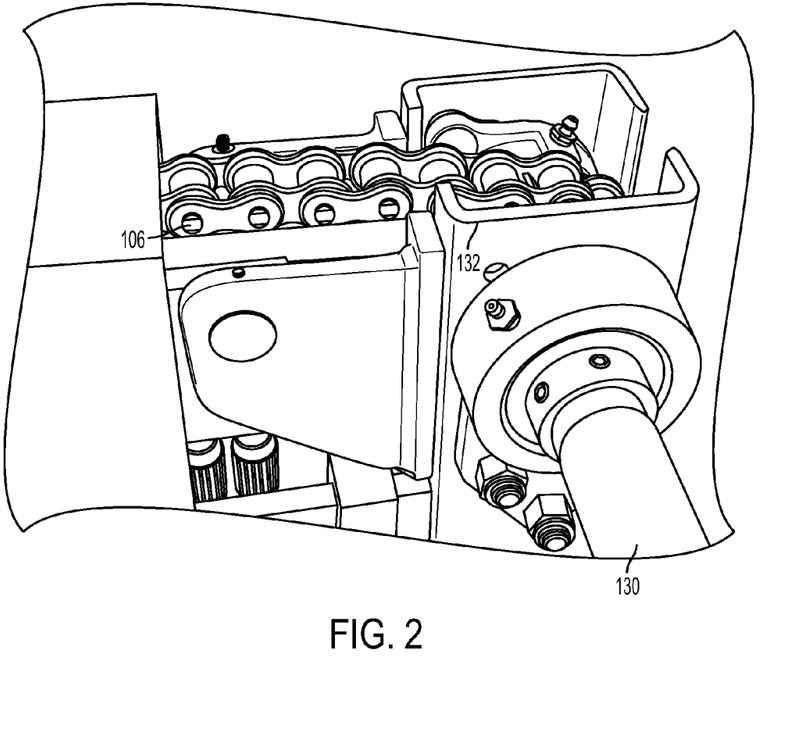
FIG. 2 illustrates an embodiment of a shaft used in embodiments of the invention.

FIG. 2 illustrates an embodiment of a shaft used in embodiments of the invention. Shaft 130, known as the lateral transverse or jack shaft, may extend across the width of the rear of the trailer. On each end of that shaft 130 may be a sprocket 132. One each end, roller chain 106 which connects the horizontally mounted hydraulic cylinders 104 to the slide bar 108 may pass over the sprocket 132. Because the sprockets 132 may be connected via shaft 130, one sprocket 132 moves with its counterpart on the other end. Thus, the movements of roller chains 106 are synchronized and this may prevent one side of platform 110 from getting ahead of the other side and causing a "wedge" or jam, which, when an automobile is sitting on platform 110, is a major problem to fix.

When a chain travels 180 degrees around a sprocket 132, for each foot that sprocket 132 moves, the free end of the chain may move two feet. Therefore, for each foot the horizontal cylinder pistons move forward, liftgate 110 may rise two feet. This allows the cylinders to be much more compact, less complex and weigh less. Embodiments of the invention may utilize gear motors to turn the shaft.

Returning to FIG. 1, in embodiments of the invention, there may be three chains at work. One chain is the previously described roller chains 106 inside track 102 which may lift bar 108 and hinge point 116 of liftgate 110. Another chain may include standard first "link" static chain 112 which may be affixed to the top of the bar 108 and to liftgate 110. A third chain may include second link chain 114 which may be connected to an anchor point 105 proximate to the top of the truck cavity (FIG. 3) on one end and mid-way along liftgate 110 on the other end, thereby creating diagonal support.

The embodiment illustrated in FIG. 1 shows the liftgate apparatus just as liftgate 110 begins to open. The hydraulic cylinders 104 may be used to raise the liftgate's hinges 116 via roller chains 106. When the piston in the top horizontal hydraulic cylinder extends, a number of things happen simultaneously. First, as the hinges 116 and liftgate 110 move upward, this movement may release two sets of mechanical latches. One latch set may be attached to a rain cap which, in the closed position, may extend over the top of liftgate 110. As the latches release, torsion springs may rotate the cap, for example, 90 degrees. Second, because liftgate 110 is vertically "balanced" on its hinge pivot in the closed position, as the top latches release, spring loaded levers may "push" liftgate 110 outward at the top, beginning the initial transition of liftgate 110 from a vertical position to a horizontal position. Third, while the second link chains 114 are almost vertical when holding the liftgate closed, as the hinges 116 of liftgate 110 move upward, second chains 114 may become more diagonal and may support liftgate 110 as it continues its rotation from a vertical to horizontal position. As hinge point 116 and bar 108 continue to rise and liftgate 110 rotates to the full horizontal position, for example, approximately nine feet above ground level, first link chains 112 begin to tighten.

FIG. 3 illustrates an embodiment of a rain guard/latch assembly used in embodiments of the invention. Note the top mounted nylon rollers 302 which may be evenly spaced along the length of the cap. A single roller may be placed at the end of a ten inch long flat piece of aluminum protruding downward at an angle. When liftgate 110 closes, it may make contact with this single extended roller first. The roller may be spring loaded and as it is pushed inward, when the rain guard is in the opened position, as shown in FIG. 3, the cams it is attached to may begin rotation of the latches to the "catch lock" position. As the liftgate 110 continues inward, it next makes contact with smaller rollers attached to the cap which causes the rain guard cap to rotate to a closed position and as it hits the stops, the latches may lock the gate in place.

When liftgate 110 rises vertically about two inches, via hydraulic pressure, it reverses this process with the cap rotating open and the spring loaded single rollers on the ten inch shafts (one on each side of the liftgate) pushing outward so the liftgate 110 can swing out from under the cap about hinges 116 and begin downward rotation. Second chains 114 limit the range of rotational movement. The benefit for a single owner/operator is that this is all automatic and provides security, safety and a weather tight seal.

Figure 4:
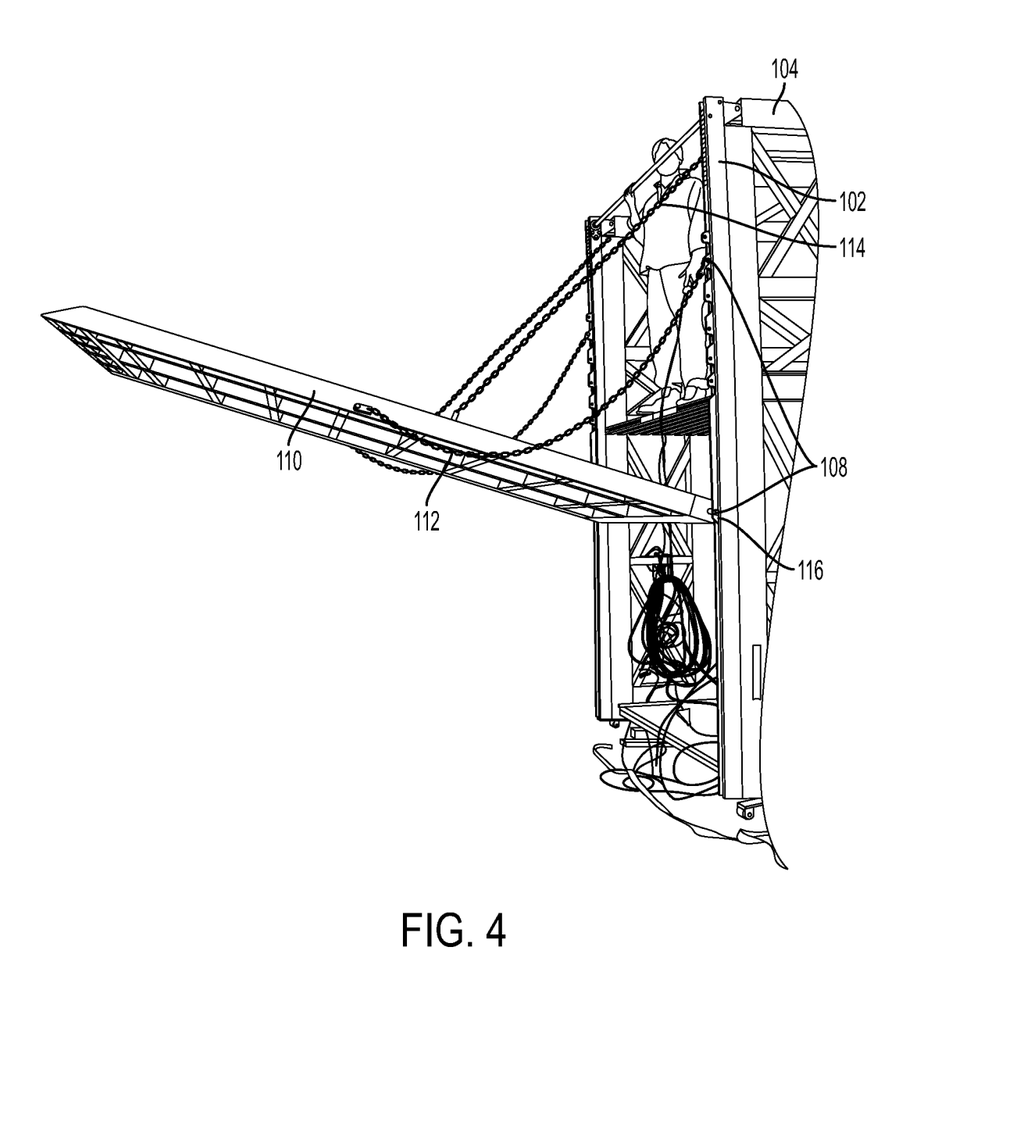
FIG. 4 further illustrates an embodiment of the liftgate apparatus, wherein the liftgate which is being opened is nearing full horizontal "platform" position.
Figure 5:
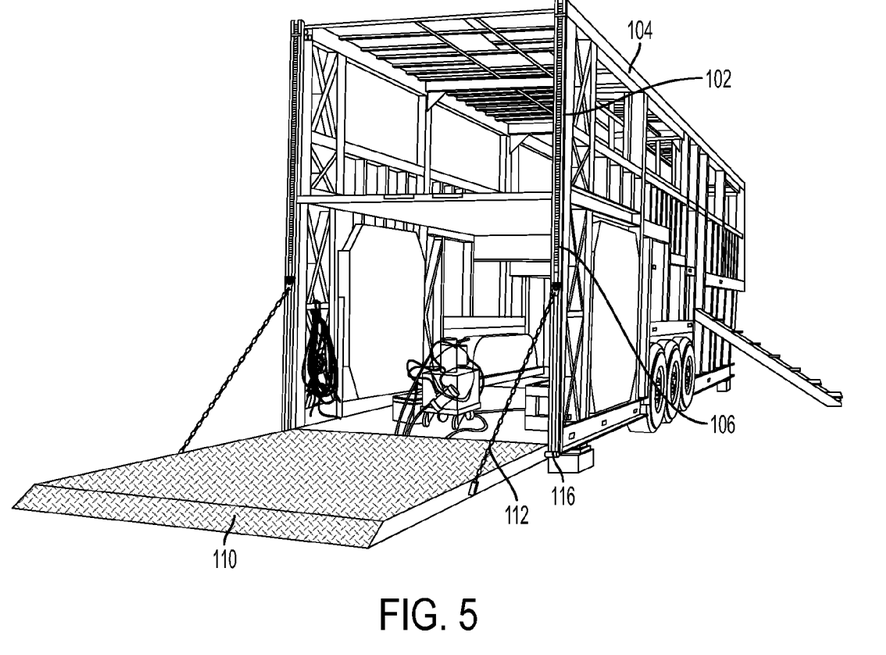
FIG. 5 illustrates an embodiment of the liftgate apparatus, wherein the liftgate is in a full horizontal "platform" position.

FIG. 4 further illustrates an embodiment of the liftgate apparatus, wherein liftgate 110 which is being opened is nearing full horizontal partially deployed position. FIG. 4 shows features of an embodiment of the liftgate apparatus as seen from the left side of the rear of the trailer. As the hinge 116 or bottom of liftgate 110 continues to rise, the second affixed chains 114 may still be supporting the top of platform/liftgate 110, but first chains 112 may lose slack and become tighter. Ultimately the rising height of the hinge side of liftgate 110 will reach a maximum extension allowed by the first chains 112, which is preferably set to an amount that maintains the liftgate 110 in a substantially horizontal orientation. If the roller chain 106 continues to lift bar 108 and hinge 116 beyond this point, first chains 112 support the weight and horizontal orientation of the liftgate 110, at which point second chains 114 will become loose. Second chains 114 can then be disconnected from liftgate 110 (FIG. 5). Subsequent movement of roller chain 106 upward or downward (without connection of second chains 114) will correspondingly move the platform 110 upward and downward akin to an elevating platform, with first chains 112 providing the angular support to maintain liftgate 110 in a horizontal orientation.

FIG. 5 illustrates an embodiment of the liftgate apparatus wherein liftgate 110 is in a full horizontal deployed position. At this point, when liftgate 110 is in the full horizontal or deployed mode, because the hinges 116 and first chains 112 are connected to the moving bars 108, it may be raised or lowered as a horizontal platform by roller chain 106 under action of the hydraulic cylinders 104 from the ground level to various deck levels. For example, in an embodiment of the invention, the elevator liftgate platform 110 can be run up and down from ground level to ten feet above ground level while remaining horizontal. To move the elevator liftgate platform 110 up, an embodiment may use hydraulic power connected through roller chains 106 inside the upright channels to horizontal cylinders 104 hidden in upper horizontal structural aluminum members. Thus, in embodiments of the invention, the small totally hidden horizontal cylinders in the top structural members of the trailer are in sharp contrast to the large vertical cylinders normally used which cause the trailer to be longer.

FIG. 6 further illustrates an embodiment of the liftgate apparatus wherein liftgate 110 is in a full horizontal or deployed position. Tall vertical channels 102 are shown on the right side, wherein a bar 108 may be located in each channel 102. At the bottom of the protruding slide bar 108, the base of platform 110 may be connected via a hinge 116 which may runs the full width of the trailer. At the top of the slide bar 108, second chain 114 may be connected to a point about eight feet out on the platform 110. When the cylinders up in the top of the trailer extend, they may pull on "roller chains" 106 which are hidden inside the vertical channels 102. Because the end of these roller chains 106 may be connected to the ends of slide bar 108, as slide bar 108 begins to move vertically, it moves the hinge point 116 of the platform vertically.

As can be seen in FIGS. 5 and 6, the bar 108, first chain 112 and liftgate 110 form a generally overall triangular shape when in deployment.

The slide bars 108 can extend below the vertical channels 102 which allow them to take the base or hinge(s) 116 of the horizontal platform 110 right down to ground level. The slide bars 108 can also rise vertically to upper deck levels, for example, about ten feet above ground level. Note that because of the "two to one" mechanical advantage of the upper level cylinders 104 and sprocket arrangement (described in FIG. 2) the hydraulic cylinders only have to extend five feet in order to raise the platform 10 ten feet.

To return the platform 110 to a closed position, it is moved to sufficient height, preferably a predefined deck level, at which the second chain 114 can reach its connection point on liftgate 110 and be reconnected thereto. When the second chains 114 are connected, the balance or pivot point of the semi-balanced platform is closer to the trailer. This means that relative to the balance point the portion of liftgate 110 adjacent the hinge 116 is actually heavier than the other end. Therefore, when the hydraulic pressure is released and roller chain 106 lowers, liftgate 110 tends to pivot toward the hinge side. Like a see-saw, when one side goes down, the other goes up. Thus, the liftgate platform 110 begins to rotate as hydraulic pressure is released. Because the hydraulic fluid can only pass through check valves at a slow controlled rate, as gravity pulls the base or hinge side 116 downward, it can only exert minimal pressure and move very slowly, which is a safety factor. According to embodiments of the invention, any resistance will stop the platform from moving.

As liftgate 110 nears the vertical or fully closed position, second chains 114 may be also almost vertical and may support much of the weight of liftgate 110 along with the hinge 116 at the base. The positioning of second chains 114 on the framework of the trailer and on the liftgate may enable steady and concise movement, as well as, the ability to gently swing liftgate 110 shut in the last ten inches of movement. When this happens, the liftgate may trip a set of cams at the top of the trailer. These cams may rotate the rain cap and latches into position, thereby locking the liftgate into the closed position. The only way to open the liftgate may be to activate the hydraulic cylinders and lift the gate vertically, at which time the cams may reverse, open the latches, and rotate the rain cap up and out of the way as the liftgate 110 opens up.

Thus, embodiments of the present invention may utilize a two to one mechanical advantage with two top mounted horizontal double cylinders 104 timed out or synchronized through a jack shaft 130. Embodiments of the inventive liftgate apparatus, therefore, may use gravity to bring liftgate 110 down to ground level and also close liftgate 110. The closing, latching, and rain cap features may enable the inventive liftgate apparatus to be used without channel extensions extending through the roof of the trailer and may cause the liftgate apparatus to be operated by one person, without physically touching the liftgate.

Figure 7:
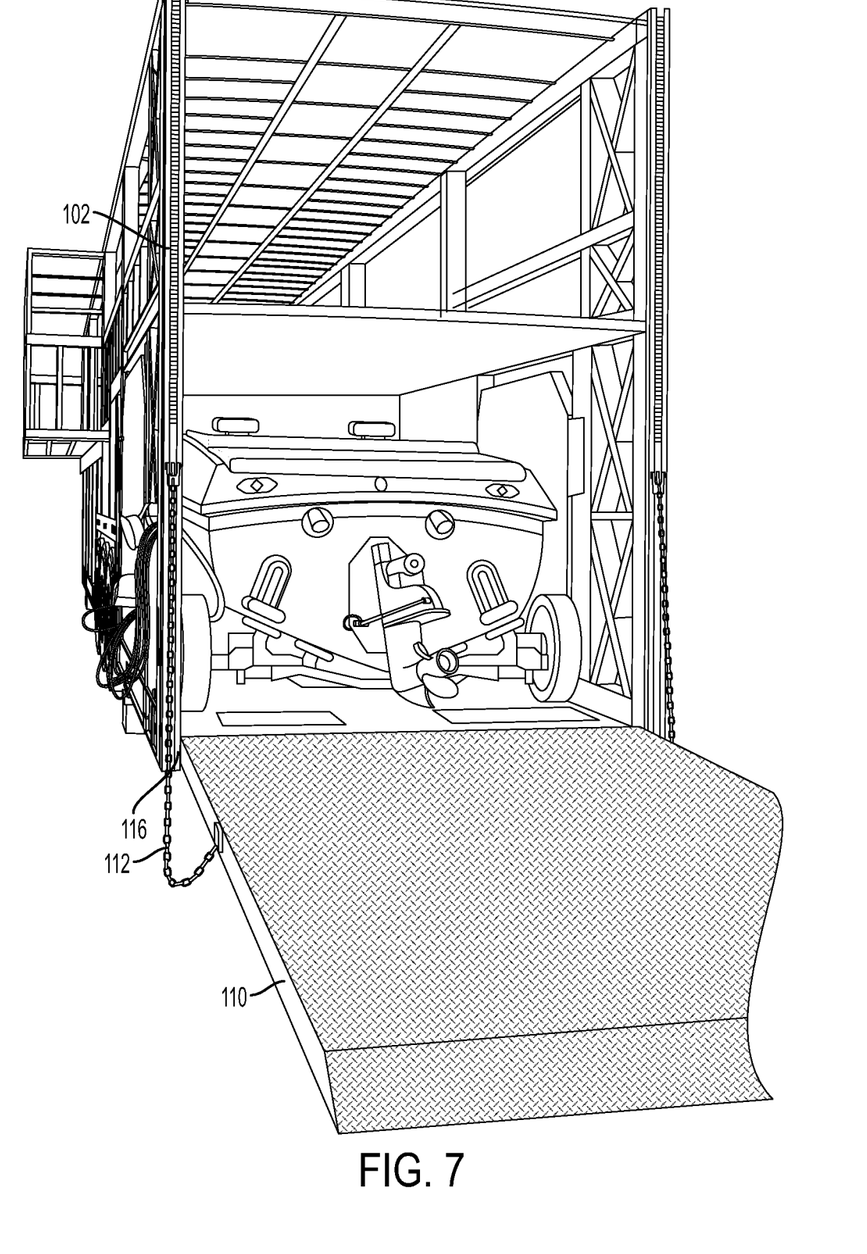
FIG. 7 illustrates an embodiment of the invention, wherein the liftgate is being, prepared to be used as a ramp.

FIG. 7 illustrates an embodiment of the invention, wherein liftgate 110 is being prepared to be used as a ramp. By lowering liftgate 110 to the ground level and disconnecting at least one end of the first link chains 112, the hinge 116 may be hydraulically lifted to the first deck level, thus creating a ground to first level ramp for loading. Key locks in the connecting links may prevent inadvertent disconnection of these chains. The ramp may then be used, for example, to load a motorized vehicle, such as a 30' long boat. One person may therefore place the inventive liftgate apparatus in the ramp position. As the population ages, embodiments of the invention advantageously allows anyone to safely adjust the liftgate and operate the liftgate apparatus with a handheld remote control unit.

Figure 8:
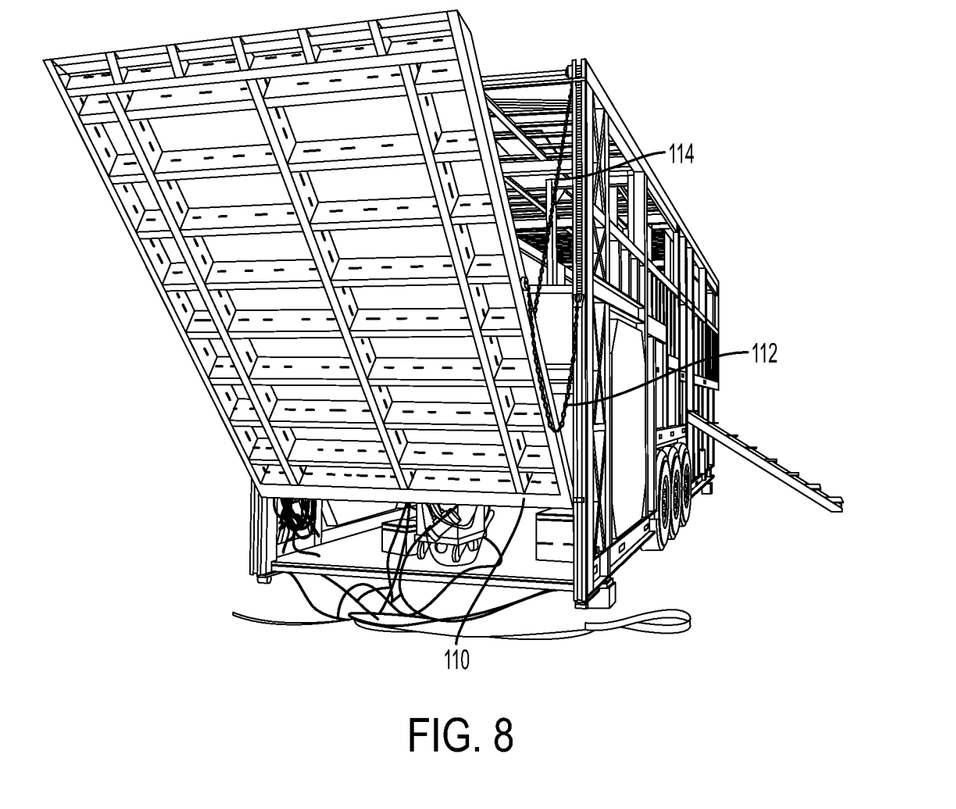
FIG. 8 illustrates an embodiment of the liftgate apparatus, wherein the liftgate is being closed.

FIG. 8 illustrates an embodiment of the liftgate apparatus, wherein liftgate 110 is being closed. To close liftgate 110, the liftgate 110 is raised to a height at which second chains 114 can be connected, and second chains 114 are reattached. It should be noted that the first chains 112 may also be attached. The liftgate apparatus also may include a remote control with a button for releasing hydraulic pressure. Since the gate is "balanced", i.e., the base at the hinge 116 side is slightly heavier than the other end, as the hydraulic fluid bleeds off, gravity pulls hinge point 116 downward very gradually and the platform 110 begins to rotate toward vertical. This movement continues until the hinge point 116 is at the lower deck level. At this point, the gate may close completely and as it strikes the cams on the hinged rain cap on top, the rain cap may rotate over the end of the gate and latches may become engaged automatically to prevent the gate from opening. Thus, when closing, liftgate 110 may rotate to a full closed position without assistance and, via cam action, the rain cap may rotate, for example, 110 degrees from an open to a closed position and may create a seal between the rain cap and the top of the liftgate. This provides unassisted opening and closing of the liftgate.

While all prior art screw type and slide bar liftgates must be "powered down" by hydraulic force, the inventive liftgate apparatus is "balanced", i.e., no hydraulic force is required to move liftgate 110 from a horizontal to vertical position or to close it for transit. According to some embodiments of the invention, gravity alone allows the platform to rotate from the horizontal to vertical position and gravity alone allows it to go to the fully closed position. The safety provision of this feature becomes obvious when one considers that several tons of downward force can crush items or fatally injure people caught in the path of a traditional descending liftgate while minimal pressure will stop the liftgate apparatus from descending and closing.

Although the present invention has been shown and described with respect to certain embodiments, it should be understood by those skilled in the art that various modifications can be made to the inventive liftgate apparatus and the method of operating the same of the instant invention without departing from the scope and spirit of the invention. It is intended that the present invention cover modifications and variations of the inventive testing device and method provided they come within the scope of the appended claims and their equivalents.

What is claimed:

1. A liftgate apparatus for a vehicle, comprising:
a track extending vertically down a side of the vehicle;
a flexible connector moveably mounted in the track;
a vertical bar connected to the flexible connector;
a hinge connected to the vertical bar;
a platform rotatably connected to the hinge;
a first support connected to the platform and the vertical bar at a point above the hinge;
a second support connected to the platform and an anchor point;
wherein the liftgate apparatus has at least the following operational states:
a closed state in which (a) the hinge is proximate to a lower deck of the vehicle, and (b) the platform is in a substantially vertical orientation;
a partially deployed state in which (a) the hinge is at an intermediate height between the lower deck and a roof of the vehicle, (b) the platform is in a substantially horizontal orientation, and (c) the platform, part of the track and the second support define a generally overall triangular shape;
a deployed state in which (a) the platform is in a substantially horizontal orientation, and (b) the platform, the vertical bar and the first support define a generally overall triangular shape, and (c) movement of the flexible connector up or down lifts the platform up and down while maintaining the platform in a substantially horizontal orientation; and
a ramp position in which the platform is inclined with the hinge generally level with the lower deck of the vehicle,
wherein the liftgate apparatus is configured to transition from the deployed state to the ramp position by lowering the platform to ground level, removing any support provided by the first support, and raising a hinge side of the platform to the lower deck level, and
wherein the vertical bar including a plurality of attachment points above the hinge configured for connection to the first support.

2. The liftgate apparatus of claim 1, wherein the second support provides substantially all of the angular support for the gate when transitioning between the closed state and the partially deployed state.

3. The liftgate apparatus of claim 1, wherein the first support provides substantially all of the angular support for the gate when in the deployed position.

4. The liftgate apparatus of claim 1, wherein the liftgate apparatus transitions from the closed state to the partially deployed state by upward movement of the flexible connector, which lifts the hinge and a hinge side of the platform, and the platform rotates about the hinge from being substantially horizontal to being substantially vertical while supported by the second support.

5. The liftgate apparatus of claim 1, wherein the liftgate transitions from the partially deployed state by transferring angular support for the platform from the second support to the first support.

6. The liftgate apparatus of claim 1, wherein the flexible connector is a plurality of roller chains.

7. The liftgate apparatus of claim 6, further comprising a sprocket proximate to the roof of the vehicle and engaging at least one of the roller chains.

8. The liftgate apparatus of claim 1, wherein the platform can be raised and lowered while maintaining its substantially horizontal orientation and without any portion of the liftgate apparatus extending above the roof of the vehicle.

9. The liftgate apparatus of claim 1, wherein the second support is longer than the first support.

10. The liftgate apparatus of claim 1, further comprising a latch configured to retain the platform in the closed state.

11. The liftgate apparatus of claim 1, wherein the first support is a chain.

12. The liftgate apparatus of claim 1, wherein the second support is a chain.

13. The liftgate apparatus of claim 1, wherein the first support is removably connected to the anchor point.

14. The liftgate apparatus of claim 1, wherein the second support is removably connected to the anchor point.

15. A liftgate apparatus for a vehicle, comprising:
first and second tracks extending down a side of the vehicle;
first and second roller chains extending in the first and second tracks, respectively;
first and second vertical bars connected to the first and second roller chains, respectively;

at least one hinge connected to the vertical bars;
a platform rotatably connected to the at least one hinge;
a first pair of chains, each connected to the platform and one of the bars;
a second pair of chains connected to the platform and anchor points;
wherein the liftgate apparatus has at least the following operational states:
a closed state in which (a) the at least one hinge is proximate to a deck of the vehicle, and (b) the platform is in a substantially vertical orientation;
a partially deployed state in which (a) the at least one hinge is at an intermediate height between the deck and a roof of the vehicle, (b) the platform is in a substantially horizontal orientation, and (c) the platform, the second pair of chains and parts of the first and second track define two generally overall triangular shapes;
a deployed state in which (a) the platform is in a substantially horizontal orientation, and (b) the platform, the vertical bars and the first pair of chains define two generally overall triangular shapes, and (c) movement of the first and second roller chains up or down lifts the platform up and down while maintaining the platform in a substantially horizontal orientation; and
a ramp position in which the platform is inclined with the hinge generally level with the deck of the vehicle,
wherein the liftgate apparatus is configured to transition from the deployed state to the ramp position by lowering the platform to ground level, removing any support provided by the first support, and raising a hinge side of the platform to the deck level.

16. The liftgate apparatus of claim 15, wherein the liftgate apparatus transitions from the closed state to the partially deployed state by upward movement of the first and second roller chains, which lift the hinge and a hinge side of the platform, and the platform rotates about the hinge from the substantially horizontal to the substantially vertical while supported by the second support.

17. The liftgate apparatus of claim 15, wherein the platform can be raised and lowered while maintaining its substantially horizontal orientation and without any portion of the liftgate apparatus extending above the roof of the vehicle.

* * * * *